2,402,419

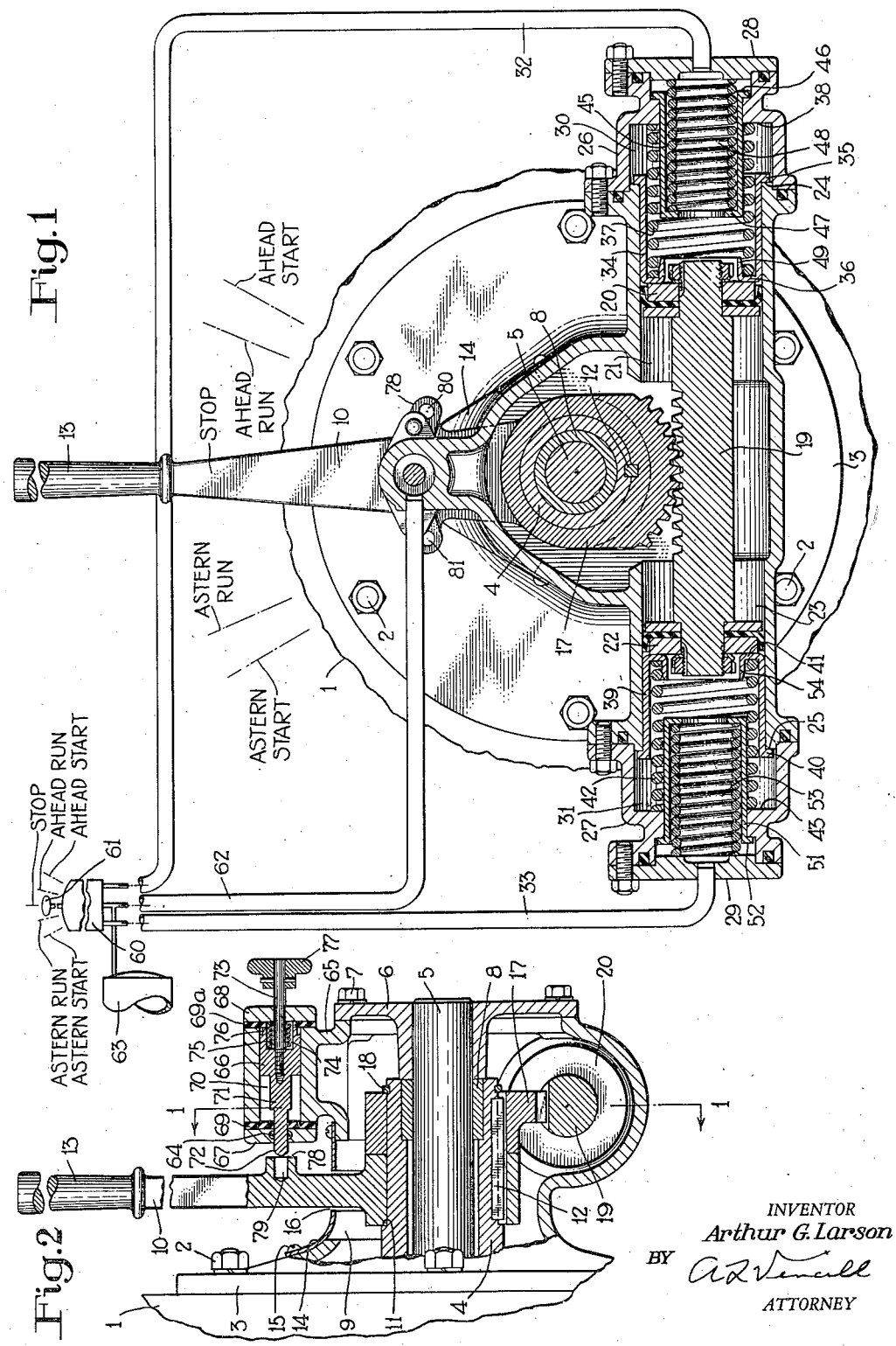
June 18, 1946.  A. G. LARSON  2,402,419
CONTROL MECHANISM
Filed Aug. 19, 1943
INVENTOR
*Arthur G. Larson*
BY
ATTORNEY Patented June 18, 1946

UNITED STATES PATENT OFFICE 2,402,419

CONTROL MECHANISM

Arthur G. Larson, Forest Hills, Pa., assignor to The Westinghouse Air Brake Company, Wilmerding, Pa., a corporation of Pennsylvania Application August 19, 1943, Serial No. 499,215

1 Claim. (Cl. 121—40)

This invention relates to control mechanism and more particularly to means for selectively controlling the positioning of a multi-position device.

Reversible Diesel engines of the type employed in marine service are usually provided with a maneuvering gear having a plurality of different positions to selectively control different operations of the engine. Certain maneuvering gears have only five positions; a neutral or stop position for stopping the engine, a forward starting position, and a reverse starting position in which the engine is put into motion in, respectively, opposite directions usually by compressed air admitted to one or more of the cylinders, and a forward running position and a reverse running position in which fuel is admitted to the cylinders in relatively reverse sequences according to the direction of operation of the engine and the firing order of the cylinders.

One object of the invention is the provision of a novel fluid pressure controlled motor arranged to respond to different pressures of fluid, corresponding to different positions of a device being controlled such as the maneuvering gear of a Diesel engine, to correspondingly position said device.

According to this object the motor is controlled by fluid pressure and embodies a plurality of precompressed springs arranged to selectively become effective in different positions of the device to oppose pressure of fluid and cooperative with said pressure of fluid to define such positions.

Another object of the invention is the provision of a fluid motor such as above defined embodying means so constructed as to automatically maintain the device in any selected position to which it has been moved under pressure of fluid, in case of failure of the fluid pressure for operating said motor.

Maneuvering gears are usually provided with hand operated means for emergency manual adjustment to the different positions. According to another feature of the invention the means which operate automatically, in case of failure of the fluid pressure supply, to hold the maneuvering gear in a position to which it had previously been moved by the fluid motor, is also effective to hold said hand operated means in any selected position upon manual adjustment thereof.

Maneuvering gears may differ from each other with respect to the number of features to be controlled and the number of different control positions, as well as in other details. These features and details are not elements of the present invention. The invention comprises motor arrangements such as defined in any of the above objects for controlling the positioning of a device having a plurality of different positions, such as five, as will be readily apparent from the description to follow.

Other objects and advantages will be apparent from the following more detailed description of the invention:

In the accompanying drawing; Fig. 1 is a diagrammatic view, partly in section and partly in elevation, of a fluid pressure control system for a device such as a maneuvering gear of a Diesel engine and showing in longitudinal vertical section, the improved fluid motor for controlling the positioning of said gear; and Fig. 2 is a vertical cross-sectional view taken through the maneuvering gear and the fluid motor therefor shown in Fig. 1, the view of the fluid motor shown in Fig. 1 being taken substantially on the line 1—1 in Fig. 2.

Description

As shown in the drawing, the reference numeral 1 indicates a portion of a reversible Diesel engine to which is connected, by one or more bolts 2, a bell-like housing 3, and extending from said engine into the housing 3 centrally thereof is a hollow tube-like maneuvering gear shaft 4 for controlling parts (not shown) in the engine whereby starting, stopping, and reversing of the engine may be controlled. The shaft 4 may have a neutral or stop position for stopping the engine, forward and reverse starting positions, and forward and reverse running positions. The means in the engine controlled by shaft 4 are not shown in the drawing and are not pertinent to the invention. Moreover, such parts are well known to those skilled in the art and a further description or showing thereof is, therefore, not essential in the present application.

The shaft 4 is arranged concentric to a support shaft 5, the outer end of which is carried in a cover 6 secured by screws 7 to the outer open end of housing 3. The outer end of shaft 4 engages an inner face of cover 6 to hold said shaft against axial movement, and secured within the outer end of said shaft is a sleeve 8 bearing and capable of rotation on the shaft 5.

The housing 3 has an opening 9 above the shaft 4 for insertion of one end of a lever 10 for mounting on said shaft against an annular shoulder 11. A key 12 secures shaft 4 to lever 10 for rotation therewith. The opposite end of lever 10 has a hand grip portion 13 which provides for manual operation of said lever to turn shaft 4 to the different positions above described. These positions of shaft 4 and of lever 10 are indicated in the drawing by the following legends; "Stop," "Ahead start," "Ahead run," "Astern start" and "Astern run." The opening 9 is closed by a cover 14 secured to housing 3 by screws 15 and said cover has a slot 16 providing for the movement of lever 10 above mentioned.

A gear segment 17 is mounted on the maneuvering gear shaft 4 in abutting relationship with lever 10 and is secured by key 12 to said shaft for turning same. Adjacent the outer face of gear segment 17 the shaft 4 is provided with an annular groove in which is disposed a ring 18 bearing against said segment and which cooperates with the shoulder 11 on shaft 4 to hold said segment and lever 10 against axial movement on said shaft.

The teeth on gear segment 17 mesh with teeth on a horizontally arranged rack 19 disposed below the shaft 4 and movable at right angles to the axis of said shaft for turning the gear segment 17 and lever 10. The opposite ends of the rack are connected respectively to an ahead piston 20 supported and disposed to reciprocate in an ahead cylinder 21, and to an astern piston 22 supported and disposed to reciprocate in an astern cylinder 23. The two cylinders 21 and 22 are formed integral with housing 3, and the adjacent or rear faces of said pistons are open to the interior of said housing which is open to atmosphere by way of slot 16 through which the lever 10 extends.

The outer ends of the two cylinders 21 and 22 are also open, and secured thereto over stop shoulders 24 and 25 are like sleeves 26 and 27, the outer ends of which are closed by covers 28 and 29, respectively. A pressure chamber 30 is thereby provided between piston 20 and cover 28, while a like pressure chamber 31 is provided between piston 22 and cover 29, and these chambers are connected respectively to pipes 32 and 33.

Slidably mounted in cylinder 21 on the pressure chamber side of piston 20 is a combined spring cage and follower 34 having at its outer end an annular outturned collar 35 arranged to cooperate with stop shoulder 24 in said cylinder to limit movement of said follower in the direction of piston 20, but providing for movement of said follower in the opposite direction into sleeve 26. At the opposite end of cage 34 is an inturned collar 36 for engaging the adjacent or front face of piston 20. One end of a coil spring 37, which is under a chosen degree of pressure, bears against collar 36, while the opposite end engages a shelf 38 in sleeve 26.

A like combined spring cage and follower 39 is slidably mounted in cylinder 23 within pressure chamber 31. This cage has at one end an annular collar 40 arranged to cooperate with stop shoulder 25 to limit movement of the cage in the direction of piston 22, and at the opposite end has an annular inturned collar 41 for engagement with said piston. A coil spring 42, like spring 37 and also under pressure, bears at one end against collar 41 while the opposite end engages a shelf 43 in the sleeve 27.

The parts are so designed that with lever 10 in "stop" position as shown in the drawing, the two spring cages 34 and 39 will be in substantial contact with the adjacent or front faces of the respective pistons 20 and 22, and the annular collars 35 and 40 will be urged into contact with stop shoulders 24 and 25 by springs 37 and 42, respectively, whereby movement of said lever in either direction from "stop" position will be relative to one and opposed by the other of said springs. It will therefore be apparent that when pressure of fluid in both pressure chambers 30 and 31 is the same, as with both chambers open to atmosphere, the maneuvering gear lever 10 will be moved to "stop" position and held therein by the opposing forces of the two springs 37 and 42.

A spring cage 45, extending into the coil spring 37, is mounted to slide in an axial bore provided through shelf 38 in sleeve 26. The outer end of this cage is provided with an annular outturned collar 46 arranged to cooperate with shelf 38 for limiting movement of said cage in the direction of piston 20; movement in the opposite direction to a position in contact with cover 28 being provided for. At the opposite end of cage 45 is an annular inturned collar 47 engaged by one end of a precompressed coil spring 48 the opposite end of which engages the cover 28. The spring cage 34 is provided adjacent piston 20 around the inner periphery of collar 36 with a forwardly extending cylindrical flange 49 arranged for engagement with collar 47 of spring cage 45 upon movement of piston 20 in the direction of the righthand an amount sufficient for positioning the lever 10 in the "astern run" position. It will be noted that this movement of piston 20 is opposed only by pressure of spring 37 and that further movement of said piston in the same direction will then be opposed by the additional force of spring 48, and may be limited by engagement of collar 35 on cage 34 with shelf 38, or by engagement of collar 46 on cage 45 with the cover 28. Upon such engagement the piston 20 will occupy a position in which lever 10 will be in the "astern stop" position.

A cage 51 like cage 45 extends into pressure chamber 31 through an axial bore provided in shelf 43 and has at its outer end an annular collar 52 arranged to cooperate with the outer surface of shelf 43 to limit inward movement of said cage, outward movement of the cage being limited by contact with cover 29. A spring 53 extending through cage 51 engages one end thereof while its opposite end engages the cover 29, this spring being like spring 48 and being confined by said cage under the same degree of pressure. The spring cage 39 is provided adjacent piston 22 and within the spring 42 with a forwardly extending cylindrical flange 54 arranged for engagement with the adjacent end of cage 51. With the parts positioned as shown in Fig. 2, the distance between the flange 54 and the adjacent end of cage 51 is such as to allow movement of piston 22 against spring 42 just into contact with cage 51 when lever 10 occupies the position indicated by the legend "Ahead run." Further movement of piston 22 in the same direction and against the additional force of spring 53 may be limited by contact between shelf 43 and the adjacent end of spring cage 39 or between cage 51 and cover 29, and in which position lever 10 will occupy the position indicated by the legend "Ahead start."

Power movement of the maneuvering gear shaft 4 to any selected one of its different positions is arranged to be obtained by supply of fluid at different selected pressures, corresponding to the desired position, to either pipe 32 or pipe 33 while maintaining the other pipe open to the atmosphere.

For thus controlling the pressure of fluid in pipes 32 and 33, said pipes may be connected to any desirable and suitable control means such for example as to a manually operative control device 60 which may be like that fully disclosed in the copending application of Cecil S. Kelley, Serial No. 463,915, filed October 30, 1942 and assigned to the assignee of the present application. Since reference may be made to this copending application and also due to the fact that the particular structural details of the control device 60 employed in the present application are not pertinent to the invention, the following description thereof will be limited to only that deemed essential to a clear understanding of the invention.

The control valve device 60 comprises a manual operating lever 61 having a neutral or "stop" position in which it is shown in the drawing, and at one side of "stop" position two positions indicated by lines bearing the legends "Ahead run" and "Ahead start," and at the opposite side of "stop" position two positions indicated by lines bearing the legends "Astern run" and "Astern start," it being noted that these positions correspond in name and relative disposition to those of the maneuvering gear shaft 4 and lever 10.

The control device 60 further comprises valve means (not shown) arranged to be conditioned by lever 61 when in "stop" position to open both of the pipes 32 and 33 to the atmosphere, and which is operative upon movement of said lever in a clockwise direction, as viewed in the drawing, to supply fluid from any suitable source, such as a pipe 62 supplied with fluid under pressure from a supply reservoir 63, to the pipe 32 at a pressure proportional to the extent of movement of the lever away from "stop" position, while maintaining the pipe 33 open to the atmosphere. It will thus be seen that in the "ahead run" and "ahead start" positions of lever 61 two different pressures of fluid will be provided in pipe 32, such for example as 35 and 70 pounds, respectively. Upon movement of lever 61 in the opposite direction from "stop" position like pressures will be provided in pipe 33 in the corresponding positions of the lever while the pipe 32 will be maintained open to the atmosphere.

With lever 61 in "stop" position opening both pipes 32 and 33 to atmosphere the two springs 37 and 42 will move pistons 20 and 22 to the position in which they are shown in the drawing for thereby actuating the gear segment 17 to turn the maneuvering gear shaft 4 and lever 10 to their "stop" position in which they are shown.

*Operation*

Assuming that the engine is connected to a ship's propeller and it is desired to cause forward or ahead movement of the ship, the operator will move lever 61 from "stop" position to "ahead start" position to thereby supply fluid to pipe 32 at the chosen pressure, such as 70 pounds, while maintaining pipe 33 open to the atmosphere. The force of the two springs 42 and 53 are such that the pressure of fluid thus supplied through pipe 32 to pressure chamber 30 to act on the ahead piston 20 will move said piston and thereby the rack 19 and astern piston 22 initially against spring 42 until cage 39 engages cage 51 and then against the additional force of spring 53 to the position defined by contact between collar 40 on the outer end of cage 39 and shelf 43 in the sleeve 27. This movement of rack 19 turns the gear segment 17 and thereby the maneuvering gear shaft 4 and lever 10 to the position indicated by the legend "Ahead start," it being noted that said position is defined by contact between the end of cage 39 and shelf 43.

After the engine is then started in any conventional manner, the operator moves lever 61 back to the position bearing the legend "Ahead run" for thereby reducing the pressure of fluid in pipe 32 to the chosen lower degree of 35 pounds while still maintaining pipe 33 open to the atmosphere. This lower pressure effective in chamber 30 on the ahead piston 20 creates a force less than the combined opposing forces of the two springs 42 and 53 but greater than the force of spring 42, by itself, with the astern piston 22 in a position in contact with cage 51 and with said cage in contact with shelf 43. As a result the combined forces of springs 42 and 53 will move piston 22, rack 19, and piston 20 back toward the right-hand to a position in which the annular collar 52 on cage 51 contacts the shelf 43 and removes the force of spring 53 from the piston 22. Since the pressure of fluid in chamber 30 acting on piston 20 creates a force in excess of the force of spring 42 in this position of piston 22, movement of said piston and thereby of rack 19 and piston 20 will stop in this position. This movement of the rack 19 and thereby of the gear segment 17 will turn the maneuvering gear shaft 4 from the "ahead start" position back to the "ahead run" position in which it will then be maintained as long as fluid at 35 pounds is maintained in pipe 32.

When subsequently it is desired to stop the engine, the operator returns lever 61 to "stop" position for thereby opening pipe 32 and piston chamber 30 to the atmosphere. When the pressure of fluid in chamber 30 effective on piston 20 is thus reduced to that of the atmosphere, spring 42 acting on piston 22 moves said piston back to the position in which the annular collar 40 on cage 39 engages the stop shoulder 25 and in which position the piston 20 substantially contacts the cage 34. The actuating force of spring 42 on piston 22 being thus removed, the two pistons and the rack 19 stop in the "stop" position shown in the drawing. This movement of piston 22 and rack 19 acts through the gear segment 17 to turn the maneuvering gear shaft 4 and thereby the lever 10 back to their "stop" positions for stopping the engine.

If the operator now desires to cause operation of the engine in the opposite or astern direction, he first moves lever 61 to the "astern start" position for thereby providing in pipe 33 fluid at the chosen degree of pressure, such as 70 pounds, while maintaining pipe 32 to the atmosphere. This pressure of fluid provided in pipe 33 and thereby in chamber 31 being effective on piston 22 moves said piston and thereby the rack 19 and piston 20 in the direction of the right-hand to a position defined by contact between collar 35 on cage 34 and shelf 38 in the sleeve 26, this movement being obtained since the springs 37 and 48, which become successively effective to oppose such movement, are like springs 42 and 53 and thus provide a force less than that provided on piston 22 by pressure of fluid. The piston 22 as it thus moves actuates the gear segment 17 to turn the maneuvering gear shaft 4 and lever 10 to the "astern start" position for thereby starting the engine in the reverse direction.

After the engine has been started in the reverse direction the operator returns lever 61 from the "astern start" position to the "astern run" position for thereby reducing the pressure of fluid in pipe 33 to the chosen lower degree of 35 pounds while maintaining pipe 32 open to the atmosphere. This reduction in pressure in chamber 31 on piston 22 produces a force which is less than that provided by the combined pressures of springs 37 and 48 acting together but which exceeds that of spring 37 by itself when the piston 20 is in the position defined by contact between the cages 34 and 45 when collar 46 on cage 45 is in contact with shelf 38. As a result, the combined force of the two springs 37 and 48 will move the pistons 20 and 22 back to the position in which collar 46 on cage 45 contacts shelf 38 for removing the force of spring 48 from the piston 20, in which position said pistons and thereby rack 19 will be stopped. This movement of rack 19 will rock the gear segment 17 and turn the maneuvering gear shaft 4 and lever 10 back to the "astern run" position in which position said parts will remain until it is subsequently desired to stop the engine or cause reverse movement thereof.

In order to stop the engine, the operator returns lever 61 to "stop" position for thereby opening pipe 33 to the atmosphere along with pipe 32. A complete release of fluid under pressure from chamber 31 then occurs and the pressure of spring 37 on piston 20 then moves said piston and thereby the rack 19 and piston 22 back to the position in which collar 35 on cage 34 engages the stop shoulder 24 in cylinder 21, in which position, the piston 22 substantially contacts the adjacent end of cage 39, so that movement of the two pistons and thereby of the rack 19 will cease. The rack 19 as it is thus returned to its neutral position actuates the gear segment 19 to return the maneuvering gear shaft 4 and thereby lever 10 to their "stop" position for stopping the engine.

It will be noted that when the maneuvering gear shaft 4 and lever 10 are in their "ahead run" position they are held in this position by pressure of fluid supplied through pipe 32 and effective in chamber 30 on piston 20. Likewise, with the maneuvering gear shaft 4 and lever 10 in the "astern run" position they are held in this position by pressure of fluid supplied through pipe 33 and effective in chamber 31 on piston 22. With the maneuvering shaft 4 and lever 10 in either of the two "run" positions it will therefore be apparent that failure of the pressure of fluid effective on piston 20 or 22, as due to breakage of the control pipe 32 or 33, or the fluid pressure supply pipe 62 would tend to result in automatic return of the maneuvering gear shaft 4 and of lever 10 to their "stop" position and cause undesired stopping of the engine. According to the invention such undesired stopping of the engine in case of failure of the fluid pressure supply is however prevented by means which will now be described.

The housing 3 is provided above the support shaft 5 with a boss 65 having a through bore containing a plunger or piston 66 which is movable in said bore in directions toward and away from one side of lever 10. The end of the bore which is adjacent lever 10 is closed by a cap 67 while the opposite end is closed by a cap 68 and interposed between these caps and the adjacent ends of the boss are sealing gaskets 69 and 69a, respectively. A pressure chamber 70 formed between cap 67 and piston 66 is constantly open preferably to the fluid pressure supply pipe 62 as shown in Fig. 1. The piston 66 has a stem 71 projecting into chamber 70 and arranged to engage gasket 69 for limiting movement of the piston in the direction of lever 10. Projecting from the end of stem 71 through a bore in cap 67 is a stem 72 of reduced cross section. The cap 67 is provided with an annular groove encircling the stem 72 and containing a ring gasket 64 engaging the peripheral surface of said stem for preventing leakage of fluid under pressure from chamber 70 past said stem to the atmosphere. A rod 73 projecting through a suitable bore in cap 68 extends from the outside of said cap into a chamber 74 provided at the opposite side of the piston, and the inner end of rod 73 is secured centrally to said piston, as by screw-threaded engagement. A spring 75 contained in chamber 74 has one end supported by cap 68 while its opposite end bears against the piston 66, this spring being under compression and therefore constantly effective for urging said piston in the direction of lever 10. The piston 66 is provided in chamber 74 with an annular sealing bead 76 for engagement with gasket 69a to prevent leakage of fluid under pressure from chamber 70 to chamber 74 from which it may escape along stem 73 to the atmosphere. A nob 77 is secured to the outer end of rod 73 for gripping by the operator.

When an adequate or safe pressure of fluid is effective in the supply reservoir 63 and supply pipe 62, such pressure acting in chamber 70 on piston 66 is arranged to move said piston to the position in which it is shown in the drawing in which the bead 76 is in sealing contact with the gasket 69a under cap 68, and to then hold said piston and thereby the rod 72 in this position, so long as this pressure condition exists.

The lever 10 is provided on the side adjacent piston 66 with an integrally formed arcuate shaped arm 78 disposed to move past the end of stem 72. This arm has a recess 79 arranged to receive the end of stem 72 with lever 10 in "stop" position; a recess 80 arranged to receive stem 72 with lever 10 in the "ahead run" position and a recess 81 arranged to receive said stem with said lever in the "astern run" position.

With piston 66 and thereby stem 72 held in the position shown in Fig. 2 when the pressure of fluid in reservoir 63 and supply pipe 62 is at a safe degree, it will be seen that the maneuvering gear shaft 4 and lever 10 can be moved by pistons 20 and 22 relative to said stem and in the manner above described. However, if with lever 10 and the maneuvering gear shaft 4 in either the "ahead run" or the "astern run" position the pressure of fluid in reservoir 63 and supply pipe 62 should fall to a degree below that considered safe as determined by the pressure of spring 75 on piston 66, it will be noted that said spring will move the piston 66 in the direction of the left-hand, as viewed in Fig. 2, for thereby moving the stem 72 into either recess 80 or 81, respectively, which recess is aligned to receive said stem with the lever 10 in such position. With the stem 72 thus disposed in either of the recesses 80 or 81, further loss of fluid pressure from pipe 62 cannot result in automatic and undesired movement of the maneuvering gear shaft 4 and lever 10 back to "stop" position, or in other words, the piston 66 will automatically operate in case of failure of the fluid pressure supply on the actuating piston 20 or 22 to hold the lever 10 in the preadjusted "run" position. The recess 79 provided to receive the piston stem 72 in "stop" position of lever 10 is of no consequence insofar as the operation just described is concerned.

The lever 10 is provided for manually adjusting the maneuvering gear shaft 4 to its different positions in case there is no fluid pressure in reservoir 63 or in case of failure of the fluid motor due possibly to failure of the supply of fluid pressure or to breakage of some part of the motor, under which condition it is desirable to have some means for assuring that said lever will remain not only in the running positions as above described but also in "stop" position. The recess 79 is provided in lever 10 for receiving the stem 72 in the "stop" position of said lever to accomplish this end. The release of lever 10 for manual movement out of "stop" position or out of either "run" position for controlling the engine by manual operation of lever 10 may be effected by the operator grasping the nob 77 and pulling same outwardly against the opposing force of spring 75 as will be apparent.

It will be noted that with the fluid motor in an operative condition at a time when there is no fluid pressure in reservoir 63, the pistons 20 and 22 will be moved upon manual operation of lever 10 to turn the shaft 4 to its different positions. As a result springs 39 and 53 will oppose movement of lever to the "ahead start" position and upon release of manual pressure on said lever will automatically return said lever and shaft 4 to the "ahead run" position in which position the piston stem 72 will automatically act to secure said lever and shaft against further movement by spring 39. The same is true with respect to the "astern start" position and "astern run" position due to the action of springs 37 and 48 on piston 20 and this is desirable in that it avoids the possibility of the operator leaving the lever 10 and shaft 4 in either start position when it is intended that these parts be in the adjacent run position.

*Summary*

From the above description it will now be seen that I have provided a relatively simple and compact power motor of the fluid pressure type which is operable to move a multi-position device, such as the maneuvering gear of an engine, to any selected one of a plurality of positions with promptness and accuracy in accordance with pressure of fluid provided in the motor corresponding to the desired selected position thereof. Of importance is the structure which prevents any change of adjustment of the device in case of failure of fluid pressure on the power motor and this structure is also arranged to cooperate with the means for manually operating the gear for holding said means in certain selected positions thereof.

Having now described my invention, what I claim as new and desire to secure by Letters Patent, is:

In combination, a source of fluid under pressure, a casing, a rockable control member in said casing having a neutral position and at one side of neutral position, second and third positions and at the opposite side of neutral position fourth and fifth positions, said second and fourth positions being arranged intermediate said neutral position and said third and fifth positions, respectively, a hand operated lever having one end secured to said member, said lever extending through a slot in said casing to the exterior thereof for operation by an operator to rock said member to its different positions, piston means in said casing operatively connected to said member and having positions corresponding to those of said member, said piston means being operable upon supply of fluid under pressure to one chamber, when fluid under pressure is released from a second chamber, to rock said member out of neutral position to said second or third positions and being operable upon supply of fluid under pressure to said second chamber, when fluid under pressure is released from said one chamber, to rock said member out of neutral position to said fourth and fifth positions, an operator's control valve device selectively operable to either supply fluid under pressure from said source to either one of said chambers or to release fluid under pressure from the last named chamber, while at the same time opening the other chamber to atmosphere, spring means in said casing arranged to oppose movement of said piston means by fluid under pressure supplied to either one of said chambers and operable upon release of fluid under pressure from the last named chamber to operate said piston means to move said member and lever to their neutral positions, locking structure associated with said lever, locking means carried by said casing and adapted to cooperate with said locking structure in said neutral, second and fourth positions of said member and lever to secure said member and lever against movement, said structure rendering said locking means ineffective to secure said member and lever against movement from said third and fifth positions to said second and fourth positions, respectively, spring means acting on said locking means and operative to urge said locking means into cooperative relation with said locking structure, means operative manually to move said locking means out of cooperative relation with said structure, a piston in said casing subject to pressure of fluid in a chamber and to opposing pressure of the last named spring means and operable when the pressure of fluid in the last named chamber exceeds that of said last named spring means to move said locking means out of cooperative relation with said structure and when of a lesser degree to render the last named spring means effective to urge said locking means into cooperative relation with said structure, and a fluid conduit establishing a fluid pressure supply communication, direct and independently of said operator's control valve device, between said source and last named chamber whereby said piston is constantly subject in the last named chamber to the pressure of fluid in said source.

ARTHUR G. LARSON.